US012166425B2

(12) United States Patent
Smit et al.

(10) Patent No.: US 12,166,425 B2
(45) Date of Patent: Dec. 10, 2024

(54) ELECTRIC DEVICE FOR A CONVERTER, CONVERTER AND ARRANGEMENT WITH AN ELECTRIC MACHINE AND A CONVERTER

(71) Applicant: Valeo Siemens eAutomotive Germany GmbH, Erlangen (DE)

(72) Inventors: Arnoud Smit, Erlangen (DE); Alexander Bucher, Nuremberg (DE); Harald Hofmann, Nuremberg (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 251 days.

(21) Appl. No.: 17/785,027

(22) PCT Filed: Dec. 10, 2020

(86) PCT No.: PCT/EP2020/085408
§ 371 (c)(1),
(2) Date: Jun. 13, 2022

(87) PCT Pub. No.: WO2021/122256
PCT Pub. Date: Jun. 24, 2021

(65) Prior Publication Data
US 2023/0015579 A1    Jan. 19, 2023

(30) Foreign Application Priority Data

Dec. 17, 2019 (DE) ............... 10 2019 134 791.2

(51) Int. Cl.
*H02M 7/48* (2007.01)
*H01G 2/02* (2006.01)
(Continued)

(52) U.S. Cl.
CPC ............ *H02M 7/003* (2013.01); *H01G 2/02* (2013.01); *H02G 5/02* (2013.01); *H02M 7/48* (2013.01)

(58) Field of Classification Search
CPC .......... H02M 7/003; H02M 7/48; H01G 2/02; H02G 5/02
See application file for complete search history.

(56) References Cited

U.S. PATENT DOCUMENTS

2009/0251875 A1* 10/2009 Nagashima ........... H01L 25/072
361/781
2023/0020447 A1* 1/2023 Schmitt ............... H01M 50/103

FOREIGN PATENT DOCUMENTS

CN    102035356 A    4/2011
CN    105514069 A    4/2016
(Continued)

OTHER PUBLICATIONS

Office Action issued in counterpart Chinese Patent Application No. CN 202080088403.X mailed Jan. 4, 2024 (13 pages).
(Continued)

*Primary Examiner* — Adolf D Berhane
(74) *Attorney, Agent, or Firm* — Osha Bergman Watanabe & Burton LLP

(57) ABSTRACT

An electrical device for a converter has at least one capacitor having a first connection and a second connection, a first busbar and a second busbar is disclosed. A respective busbar has a greater extension along a transverse direction than along a longitudinal direction, and has a greater extension along the longitudinal direction than along a vertical direction. The respective busbar has a first surface and a second surface which are opposite one other with respect to the vertical direction. The device also has a first contact-con-
(Continued)

nection device electrically conductively contact-connected to the first connection and via which the first connection is electrically conductively connected to the first busbar, and a second contact-connection device electrically conductively contact-connected to the second connection via which the second connection is electrically conductively connected to the second busbar. The busbars delimit a connection space in the vertical direction for connecting a semiconductor power unit.

15 Claims, 13 Drawing Sheets

(51) Int. Cl.
*H02G 5/02* (2006.01)
*H02M 7/00* (2006.01)

(56) References Cited

FOREIGN PATENT DOCUMENTS

| CN | 108370652 A | 8/2018 |
| EP | 2099119 A2 | 9/2009 |
| EP | 3457418 A1 | 3/2019 |
| JP | 2017-022863 A | 1/2017 |
| WO | 98/04029 A1 | 1/1998 |
| WO | 2019/032874 A1 | 2/2019 |

OTHER PUBLICATIONS

Search Report issued in corresponding German Patent Application No. 10 2019 134 791.2, dated May 17, 2021 (8 pages).
International Search Report and Written Opinion issued in corresponding International Patent Application No. PCT/EP2020/085408, mailed on Mar. 15, 2021 (13 pages).

* cited by examiner

ELECTRIC DEVICE FOR A CONVERTER, CONVERTER AND ARRANGEMENT WITH AN ELECTRIC MACHINE AND A CONVERTER

The present invention relates to an electrical device for a converter, comprising a capacitor arrangement having at least one capacitor having a first connection and a second connection; a first busbar and a second busbar, wherein a respective busbar at least within a section has a greater extension along a transverse direction than along a longitudinal direction, within the section has a greater extension along the longitudinal direction than along a vertical direction and in the section has a first surface and a second surface which are opposite one another with respect to the vertical direction; a first contact-connection device which is electrically conductively contact-connected to the first connection of the at least one capacitor and via which the first connection of the at least one capacitor is electrically conductively connected to the first busbar; and a second contact-connection device which is electrically conductively contact-connected to the second connection of the at least one capacitor and via which the second connection of the at least one capacitor is electrically conductively connected to the second busbar.

In addition, the invention relates to a converter and to an arrangement having an electric machine and a converter.

In electrical devices of this type, the busbars serve to connect the capacitor arrangement to a semiconductor power unit on the DC voltage side and typically also form a connection option for DC voltage connections of the converter. The capacitor arrangement is connected to the busbars by the contact-connection devices, with the connections of the at least one capacitor typically being welded to the contact-connection device. According to the prior art, it is known to form individual tab-like connections on the busbars, these connections each being contact-connected to corresponding tab-like connection elements of the semiconductor power unit.

The invention is based on the object of specifying an electrical device for a converter which is improved in comparison thereto, in particular with regard to the electromagnetic and/or thermal behavior during operation.

To achieve this object, in an electrical device of the type mentioned at the beginning, provision is made according to the invention for the second surface of the first busbar to be opposite to and spaced apart in the vertical direction from the first surface of the second busbar in the section, such that the busbars delimit a connection space in the vertical direction for connecting a semiconductor power unit.

The invention is based on the idea of using the busbars to implement a transverse rail system which delimits the connection space for connecting the semiconductor power unit on both sides in the vertical direction. Individual connection elements, which are each provided for connection to the first or the second busbar, can thus be inserted from the longitudinal direction into the connection space and connected to one another and to the capacitor arrangement by means of the respective busbar.

In comparison with a conventional connection of the semiconductor power unit by means of individual tab-like connection elements of the busbar, the ability of the transverse rail system to store magnetic field energy when operating with alternating currents is significantly reduced. As a result, lower stray inductances are advantageously realized between the semiconductor power unit and the busbar. At the same time, the busbars form an electromagnetic shielding of the connection space in the vertical direction. In particular, this makes it possible to use particularly high switching frequencies of the semiconductor power unit, such as are made possible by modern silicon carbide MOSFETs and other wide band gap devices. On the one hand, there are lower switching losses due to the lower stray inductance at high switching frequencies. On the other hand, the shielding simultaneously limits the high-frequency electromagnetic fields radiated to the outside at a higher switching frequency.

The reduction in stray inductance implemented according to the invention can be explained by the fact that separate connection elements of the semiconductor power unit act like a two-wire line for a respective busbar, which two-wire line spans a surface permeated by a magnetic flux and thus stores electrical energy. This is typically modeled in an electrical network as a parasitic series inductance between the busbar and the semiconductor power unit. In the case of direct current, a magnetic field forms inside a respective connection element, whereas for high frequencies the magnetic field is displaced due to eddy current formation, such that the interior of the connection element is field-free for very high frequencies. Typically, a conductor structure of this type is divided here into an inner and outer inductance, with the inner inductance making no contribution to the total inductance for very high frequencies. The formation of the magnetic field lines between corresponding connection elements of the semiconductor power unit is now modified by the busbars delimiting the connection space in such a way that the ability of said magnetic field lines to store magnetic field energy is significantly reduced. In the case of high frequency, a magnetic dipole moment in particular shifts from the vertical direction to the transverse direction. Due to the induced eddy currents, the inside of the busbars is field-free and the mean path lengths of the magnetic field lines are significantly lengthened, which explains the reduction in stray inductance.

It should also be mentioned that the transverse rail system also results in a lower transmission resistance because alternating components of the current flowing along the busbars also have a common current path to the contact-connection devices.

A further advantage of the device according to the invention can be identified from a thermal point of view. The busbars implement a high degree of thermal decoupling of the capacitor arrangement from the semiconductor power unit because they extend in the transverse direction along the connection space and thus implement a high current-carrying capacity. Due to the resulting large surface areas of the busbars, the device according to the invention allows efficient cooling on one or both sides. This is relevant precisely with regard to the typically low maximum permissible operating temperature of the capacitor arrangement compared to the semiconductor power unit, in particular when capacitors with films based on polypropylene with a typical maximum permissible operating temperature of 105° C. are used.

Moreover, the installation space that is conventionally required for the separate tab-like connection elements of the busbar can be saved and the occurrence of power losses due to assembly transitions can be reduced. The equally low-effort transverse rail system can also be implemented cost-effectively.

With regards to the capacitor arrangement, it is preferred if it has a plurality of capacitors. The or a respective capacitor can be designed as a film capacitor. It is preferred if the capacitor is based on polypropylene. Typically, the first connection and the second connection of the or a respective capacitor are formed on opposite sides of the capacitor, in particular spaced apart from one another in the vertical direction. The capacitor arrangement also preferably has a housing in which the or a respective capacitor is accommodated. Typically, the capacitors are enclosed in the housing by means of a potting compound.

The contact-connection devices are typically connected in a materially bonded manner to the first or the second connection of the or a respective capacitor, preferably by a welded connection. The connections of the or a respective capacitor can be formed on a Schoop layer. The contact-connection devices are preferably each formed from a metal sheet which is guided at an angle along the capacitors to the busbars. The contact-connection devices are typically enclosed in sections in the housing of the capacitor arrangement by the potting compound. An end section of a respective contact-connection device, which is guided to the busbar, expediently protrudes from the potting compound.

In the device according to the invention, provision may be made for the first contact-connection device to be contact-connected to the second surface of the first busbar. In other words, in this case the first contact-connection device extends into the connection space. As an alternative, it is also possible for the first contact-connection device to be contact-connected to the first surface of the first busbar.

Analogously, provision may be made in the second contact-connection device for it to be contact-connected to the first surface of the second busbar. In this case, too, the second contact-connection device extends into the receiving space. As an alternative, provision may be made for the second contact-connection device to be contact-connected to the second surface of the second busbar.

In addition, in the electrical device according to the invention, provision may be made for the first contact-connection device and/or the second contact-connection device in the region thereof that contact-connects the busbar to have connection elements that are separated in the transverse direction. If the first or the second contact-connection device has connection elements separated in this way, the previously described stray-inductance-reducing effect can also be achieved with regard to the contact-connection device or the contact-connection devices due to the direct contact-connection to the corresponding busbar.

The electrical device according to the invention expediently further comprises the semiconductor power unit, which has at least one semiconductor switch arrangement, a first connection arrangement and a second connection arrangement, wherein the first connection arrangement is electrically conductively connected to the first busbar and the second connection arrangement is electrically conductively connected to the second busbar. Typically, the connection arrangements extend into the connection space from the longitudinal direction. In particular with regards to the realization of an inverter, one semiconductor switch arrangement is provided for each phase. The or a respective semiconductor switch arrangement typically includes a half-bridge formed from semiconductor switching elements.

In this case, it is preferred if the first connection arrangement is contact-connected to the first busbar and/or the second connection arrangement is contact-connected to the second busbar.

Provision may be made for the first connection arrangement to have only a single connection element. As an alternative, provision is made for the first connection arrangement to have a plurality of connection elements that are separated in the transverse direction. As an alternative or in addition, provision may be made for the second connection arrangement to have a plurality of connection elements that are separated in the transverse direction. However, it is also possible here for the second connection arrangement to have only a single connection element. Typically, at least one connection element of the first connection arrangement and/or at least one connection element of the second connection arrangement is provided for each semiconductor switch arrangement.

In addition, provision may be made for the first connection arrangement and the second connection arrangement to extend in a plane spanned by the longitudinal direction and the transverse direction. It is then preferred if the second surface of the first busbar and/or the first surface of the second busbar has or have projections pointing into the connection space in order to contact-connect the respective connection arrangement.

According to an alternative preferred configuration, provision is made for the first connection arrangement and the second connection arrangement each to extend in a plane spanned by the longitudinal direction and the transverse direction, wherein the planes are spaced apart in the vertical direction. The projections mentioned can then be dispensed with, which simplifies the manufacture of the busbars.

According to a specific configuration of the electrical device, which further comprises the semiconductor power unit, which has at least one semiconductor switch arrangement, a first connection arrangement and a second connection arrangement, wherein the first connection arrangement is electrically conductively connected to the first busbar and the second connection arrangement is electrically conductively connected to the second busbar, provision may be made for the first contact-connection device to be contact-connected to the second surface of the first busbar and for the first connection arrangement to be electrically conductively connected to the first busbar via the first contact-connection device or for the first connection arrangement to be contact-connected to the second surface of the first busbar and for the first contact-connection device to be electrically conductively connected to the first busbar via the first connection arrangement. As an alternative or in addition, it is possible for the second contact-connection device to be contact-connected to the first surface of the second busbar and for the second connection arrangement to be electrically conductively connected to the second busbar via the second contact-connection device or for the second connection arrangement to be contact-connected to the first surface of the second busbar and for the second contact-connection device to be electrically conductively connected to the second busbar via the second connection arrangement.

In an advantageous configuration of the electrical device according to the invention, provision is also made for an isolating means which electrically isolates the busbars from one another to be arranged in the connection space.

The electrical device according to the invention preferably also comprises a clamping device by way of which the busbars and the contact-connection devices are clamped together. The clamping device may comprise, for example, a plurality of screws which pass through one of the busbars and are screwed into threaded sleeves arranged on the other busbar. Typically, the clamping device is electrically isolated from the busbars.

As an alternative or in addition, the electrical device according to the invention can also comprise a pressing device by means of which the busbars and the contact-connection devices are pressed together. The pressing device can have one or more spring elements which press the busbars together by means of a restoring force acting against an armature. The springs are preferably designed as leaf springs or alternatively as helical springs.

According to alternative configurations, the busbars and the contact-connection devices are welded, soldered or otherwise connected in a materially bonded manner.

In a particularly preferred configuration of the device according to the invention, it further has a cooling device which is thermally conductively connected to a busbar or to the busbars. With particular advantage, the transverse rail system provides an easily accessible heat transfer surface which can be actively cooled in an excellent manner. This reinforces the thermal decoupling of the capacitor arrangement from the semiconductor power unit mentioned at the beginning. In conventional electrical devices, there is specifically not enough space for arranging the cooling device, especially since the tab-shaped connection elements of conventional busbars are already mostly covered by screws.

In an advantageous development, provision may be made for the cooling device to lie flat on the first surface of the first busbar and/or flat on the second surface of the second busbar. For this purpose, the cooling device preferably comprises a heat transfer medium, such as a gap filler, which is applied to the or a respective busbar.

The object on which the invention is based is also achieved by a converter, comprising an electrical device according to the invention, wherein the capacitor arrangement is designed as a link circuit capacitor and the busbars form DC voltage connections. The converter is preferably designed as an inverter or as an active rectifier.

Finally, the object on which the invention is based is also achieved by an arrangement having an electric machine and a converter according to the invention, which converter is connected to the electric machine to provide a single-phase or multi-phase AC voltage.

Further advantages and details of the present invention emerge from the exemplary embodiments described below and on the basis of the drawings. These are schematic illustrations in which.

Figure 1:
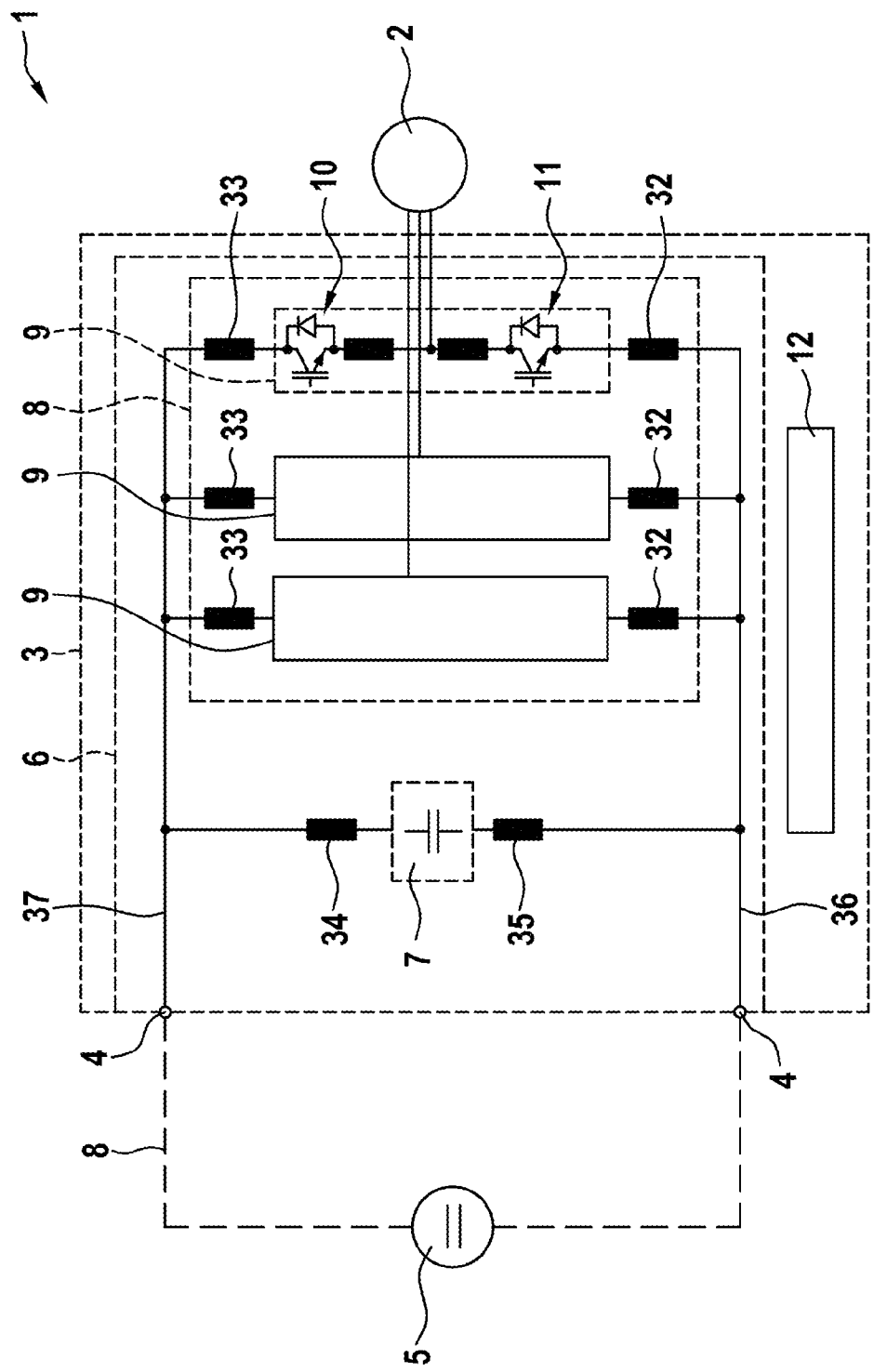
FIG. 1 shows a circuit diagram of an exemplary embodiment of the arrangement according to the invention having an exemplary embodiment of the converter according to the invention.

FIG. 1 is a block diagram of an exemplary embodiment of an arrangement 1 having an electric machine 2 and an exemplary embodiment of a converter 3, which is connected to the electric machine 2 to provide a multi-phase, in this case three-phase, AC voltage. The converter 3 has DC voltage connections 4 which are shown in a state connected to an external DC voltage source 5 in the form of a high-voltage battery.

The converter 3 comprises an electrical device 6 according to one of the exemplary embodiments explained below. The electrical device 6 comprises a capacitor arrangement 7 and a semiconductor power unit 8. Said semiconductor power unit comprises a plurality of semiconductor switch arrangements 9 which are each formed by a half-bridge made up of two semiconductor switch elements 10, 11. For the sake of clarity, the internal structure in FIG. 1 is only shown for one semiconductor switch arrangement 9. A phase of the AC voltage for the electric machine 2 can be provided at a tap between the semiconductor switch elements 10, 11 of a respective semiconductor switch arrangement 9. FIG. 1 also shows, purely schematically, a control unit 12 of the converter 6, which controls the semiconductor power unit for generating the multi-phase AC voltage.

Figure 2:
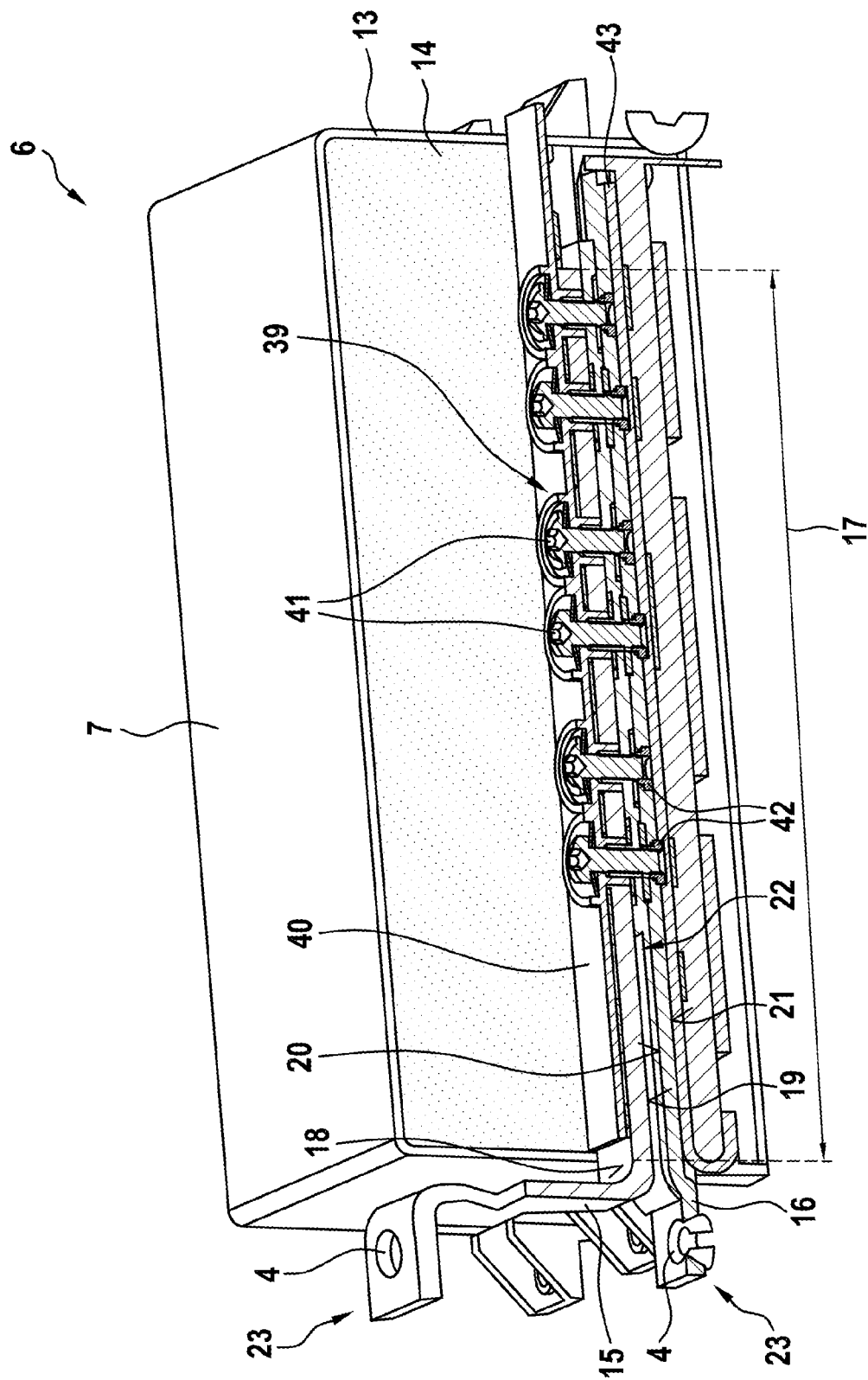
FIG. 2 shows a sectioned perspective view of a first exemplary embodiment of the device according to the invention.
Figure 3:
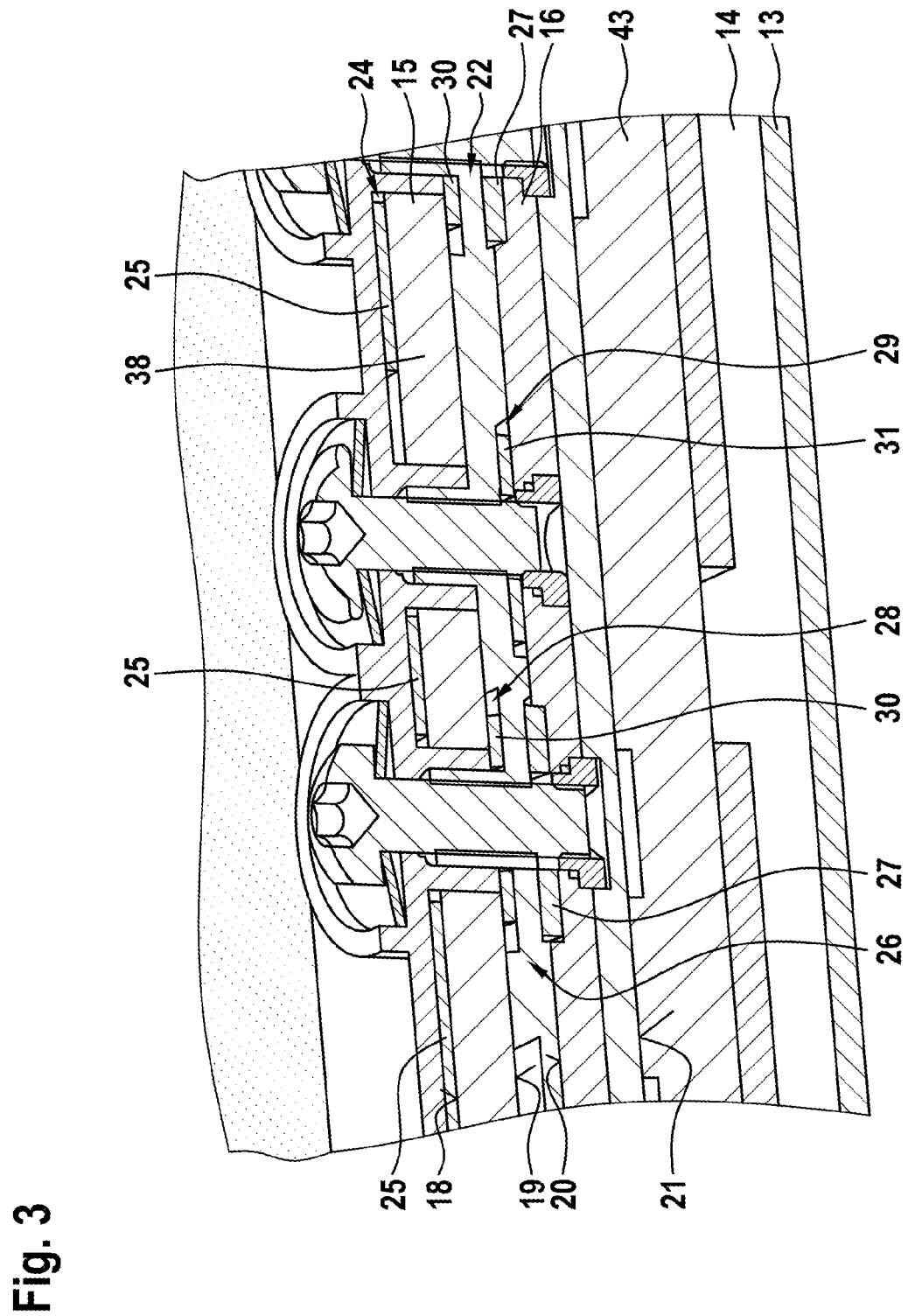
FIG. 3 shows a detailed view of FIG. 2.

FIG. 2 is a sectioned perspective view of a first exemplary embodiment of the electrical device 6. FIG. 3 is a detailed view of the same.

In this exemplary embodiment, the capacitor arrangement 7 comprises a housing 13 in which a plurality of capacitors designed as film capacitors are arranged, each of which has a first connection and a second connection. The capacitors are encapsulated in the housing 13 by means of a potting compound 14, such that they are obscured in the drawings.

In addition, the electrical device 6 comprises a first busbar 15 and a second busbar 16. Within a section 17 of a respective busbar 15, 16, the busbar 15, 16 has a greater extension along a transverse direction than along a longitudinal direction. Within the section 17, a respective busbar 15, 16 also has a greater extension along the longitudinal direction than along a vertical direction. In this case, a first surface 18 and a second surface 19 of the first busbar 15 are opposite one another with respect to the vertical direction, and a first surface 20 and a second surface 21 of the second busbar 16 are opposite one another with respect to the vertical direction. The second surface 19 of the first busbar 15 is opposite to and spaced apart in the vertical direction from the first surface 20 of the second busbar 16, such that the busbars 15, 16 or the surfaces 19, 20 thereof in the section 17 delimit a connection space 22 in the vertical direction for connecting a semiconductor power unit 8.

The section 17 of a respective busbar 15, 16 is followed by a further section 23 which protrudes at an angle from the section 17 and forms the DC voltage connections 4.

In addition, the electrical device 6 comprises a first contact-connection device 24 which is electrically conductively contact-connected to the first connection of the capacitors. A respective first connection of the capacitors is electrically conductively connected to the first busbar 15 via the first contact-connection device 24. The first contact-connection device 24 extends here as a metal sheet within the housing 13 and is enclosed there by the potting compound 14. Connection elements 25 protrude from said first contact-connection device in the longitudinal direction, the connection elements being separated in the transverse direction and making contact with the first busbar 15 by lying on the first surface 18.

In addition, the electrical device 6 comprises a second contact-connection device 26 which is electrically conductively contact-connected to the second connection of a respective capacitor. The second connection of the respective capacitor is electrically conductively connected to the second busbar 16 via the second contact-connection device 26. Like the first contact-connection device 24, the second contact-connection device 26 also extends within the housing 13 and is enclosed by the potting compound 14. Connection elements 27 protrude from the potting compound 14 in the longitudinal direction, the connection elements being separated in the transverse direction and extending into the connection area 22. There they make contact with the second busbar 16 by resting on the first surface 20.

The contact-connection of the contact-connection devices 24, 26 to the first or second connection of a respective capacitor is implemented by a materially bonded connection to a Schoop layer.

The semiconductor power unit 8 comprises a first connection arrangement 28 which is electrically conductively connected to the first busbar 15 and a second connection arrangement 29 which is electrically conductively connected to the second busbar 16. The connection arrangements 28, 29 each extend in the longitudinal direction from the side opposite the capacitor arrangement 7 into the connection space 22.

The first connection arrangement 28 has a connection element 30 and the second connection arrangement 29 has a connection element 31 for each semiconductor switch arrangement 9. With reference to FIG. 1, the connection elements 30 of the first connection arrangement 28 are connected to the semiconductor switch elements 11 and the connection elements 31 of the second connection arrangement 29 are connected to the semiconductor switch elements 10. FIG. 1 also shows, for a respective semiconductor switch arrangement 9, a stray inductance 32 caused by a respective connection element 30 of the first connection arrangement 28, and a stray inductance 33 caused by a respective connection element 31 of the second connection arrangement 29. Analogous to this, stray inductances 34, 35, caused by the contact-connection devices 24, 26, are shown. The stray inductances 32 to 35 are each modeled as concentrated components in the block diagram.

It is also clear from FIG. 2 and FIG. 3 that the connection arrangements 28, 29 each extend in a plane spanned by the longitudinal direction and the transverse direction, wherein the planes are spaced apart in the vertical direction. In other words, the connection arrangements 28, 29 are offset in the vertical direction. The connection elements 30 of the first connection arrangement 28 in this case lie on the second surface 19 of the first busbar 15 and thus make contact with it. Correspondingly, the connection elements 31 of the second connection arrangement 29 lie on the first surface 20 of the second busbar 16 and thus make contact with it.

In the present exemplary embodiment, the first connection of a respective capacitor, the first contact-connection device 24 and the first connection arrangement 28 are connected via the first busbar 15 to a first, in this case negative, potential 36 of the electrical device 6 and the second connection of a respective capacitor, the second contact-connection device 26 and the second connection arrangement 29 are connected to a second, in this case positive, potential 37 of the electrical device 6.

In addition, the electrical device 6 in the receiving space comprises an isolating means 38 which electrically isolates the busbars 15, 16 from one another.

As can be seen in particular from FIG. 2, the busbars 15, 16 and the contact-connection devices 24, 26 are clamped to one another by means of a clamping device 39. The clamping device 39 comprises an isolating element 40 arranged on the side of the first surface 18 of the first busbar 15 and a plurality of screws 41 which pass through the isolating element 40, the first busbar 15 and the isolating means 38 and protrude into the second busbar 16. In order to tighten the screws 41, the clamping device 39 has threaded sleeves 42 fastened to the second busbar 16 for each screw 41. In this case, one portion of the screws 41 also penetrate the connection elements 30 of the first connection arrangement 28 and the connection elements 27 of the second contact-connection device 26, and another portion of the screws 41 penetrate the connection elements 31 of the second connection arrangement 29.

The electrical device 6 also comprises a cooling device 43 which is thermally conductively connected to the second busbar 16 by lying flat on the second surface 21 of the second busbar 16.

Figure 4:
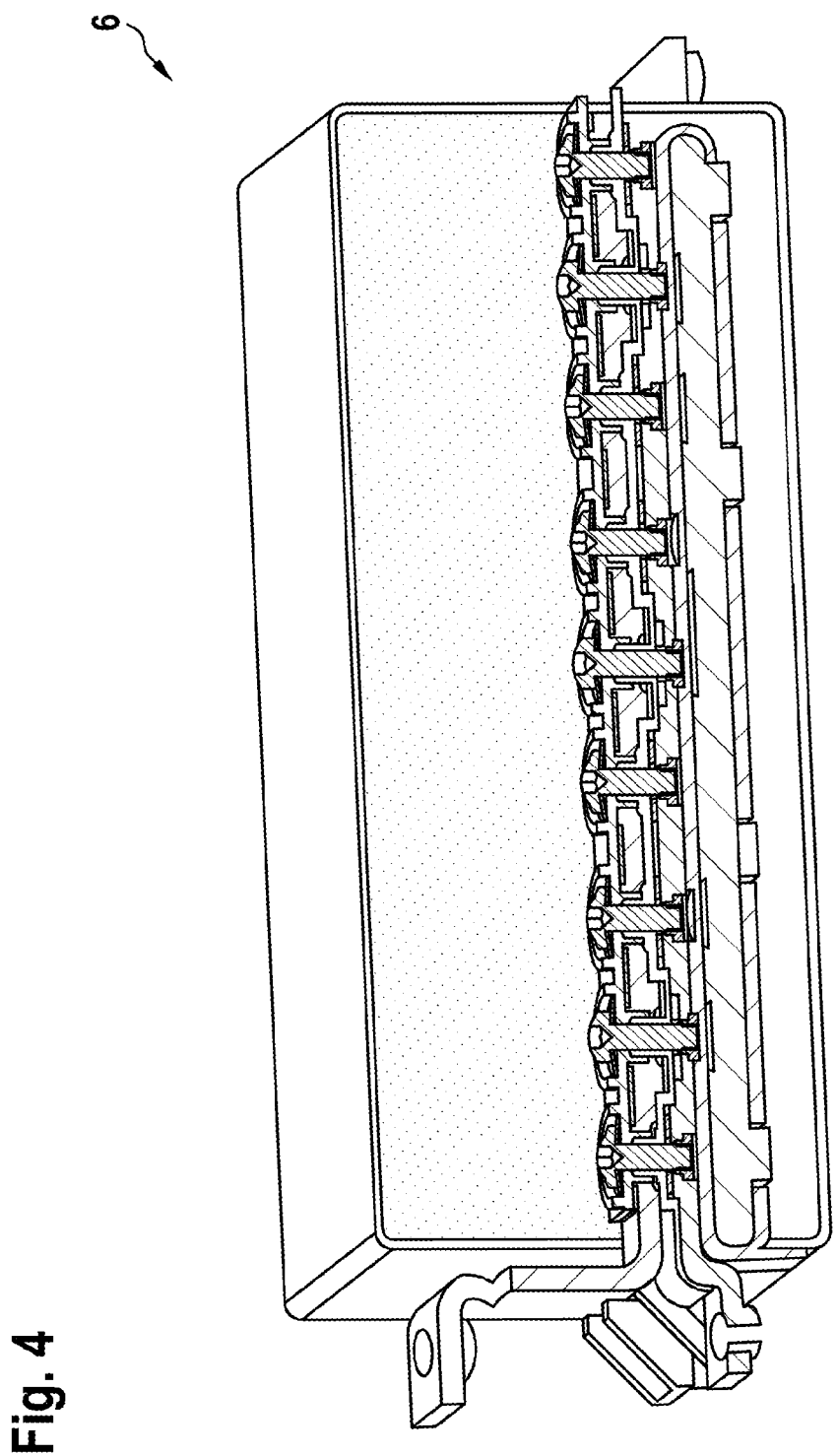
FIG. 4 shows a sectioned perspective view of a second exemplary embodiment of the device according to the invention.
Figure 5:
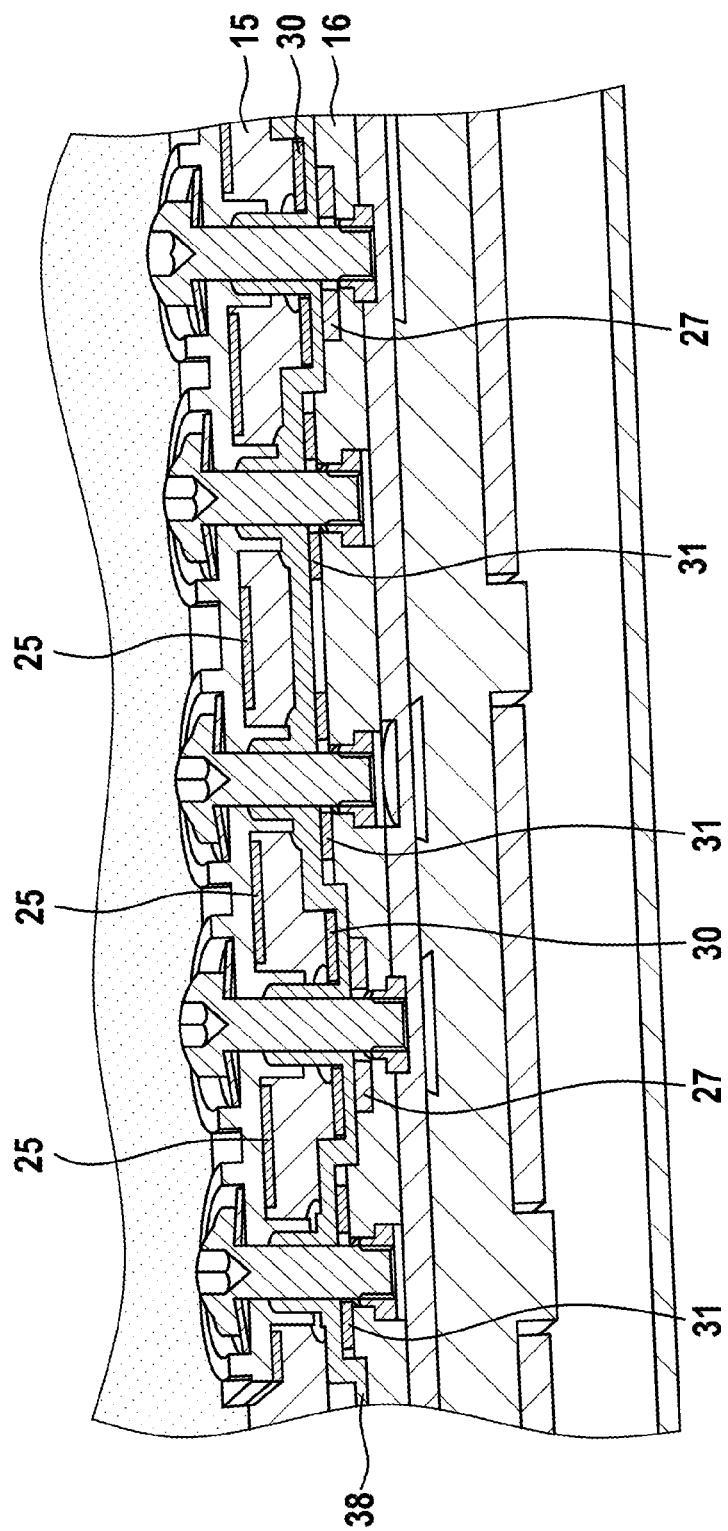
FIG. 5 shows a detailed view of FIG. 4.

FIG. 4 is a sectioned perspective view of a second exemplary embodiment of the electrical device 6. FIG. 5 is a detailed view of the same. The second exemplary embodiment of the electrical device 6 essentially corresponds to the first exemplary embodiment, with the exception of the differences described below. In this case, components that are the same or have the same effect are provided with identical reference signs in this and the other exemplary embodiments.

In the second exemplary embodiment, the first connection arrangement 28 of the semiconductor power unit 8 has two connection elements 31 for a respective semiconductor switch element 10. The connection arrangements 28, 29 or connection elements 30, 31 thereof are arranged in a plane spanned by the longitudinal direction and the transverse direction. As a result, both the first busbar and the second busbar 16 have a large number of projections in order to make contact with the connection arrangements 26, 27. The isolating means 38 traces this surface structure of the busbar 15, 16.

Figure 6:
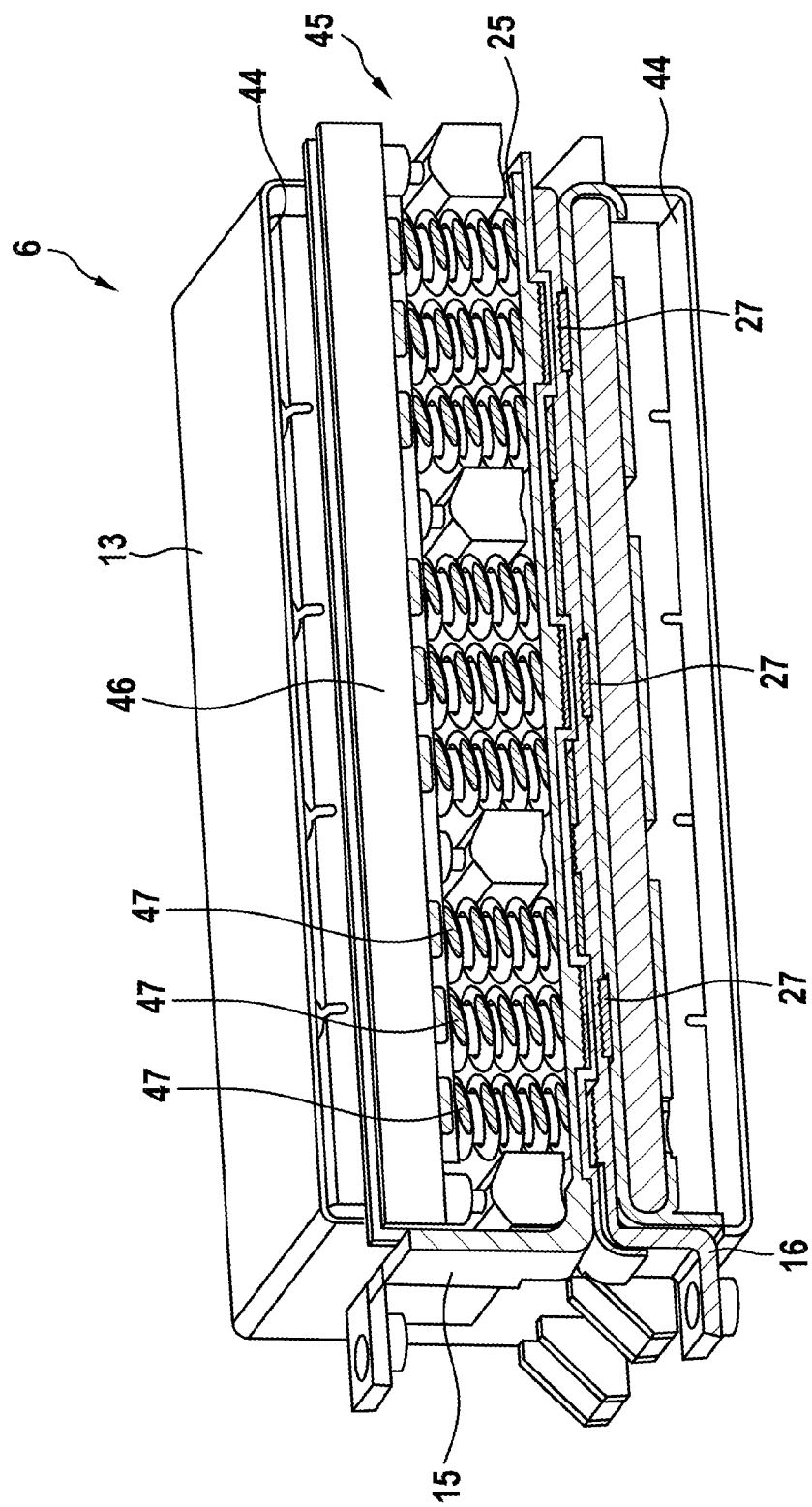
FIG. 6 shows a sectioned perspective view of a third exemplary embodiment of the device according to the invention.
Figure 7:
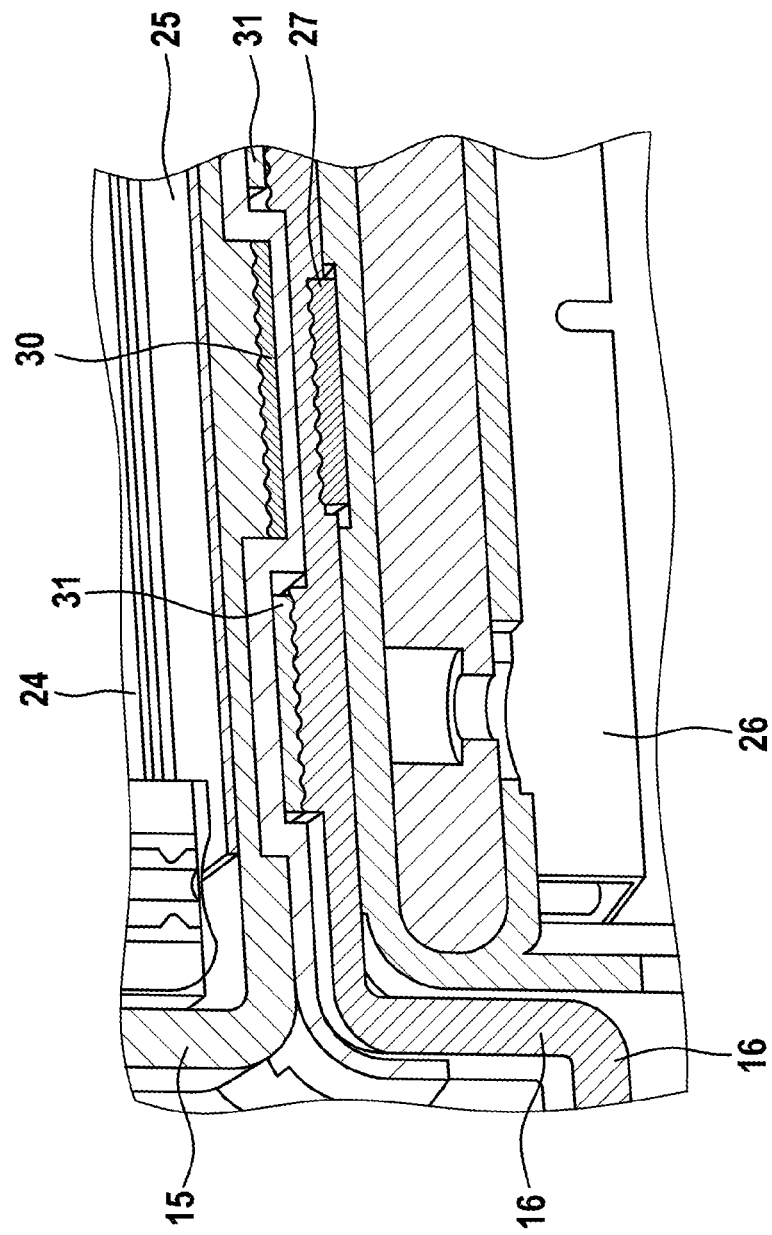
FIG. 7 shows a detailed view of FIG. 6.

FIG. 6 is a sectioned perspective view of a third exemplary embodiment of the electrical device 6. FIG. 7 is a detailed view of the same. This exemplary embodiment essentially corresponds to the second exemplary embodiment, with only the differences thereto being discussed below.

In this exemplary embodiment, the contact-connection devices 24, 26 already extend from the edges 44 of the housing 13 outside of the housing 13 and do not emerge from the potting compound 14 only at the level of the busbar 15, 16, as in the previous exemplary embodiments. In this exemplary embodiment, the first contact-connection device 24 has only a single connecting element 25 that is continuous in the transverse direction.

Instead of a clamping device, the electrical device 6 according to the third exemplary embodiment has a pressing device 45 by means of which the first busbar 15 is pressed against the second busbar 16. For this purpose, the pressing device 45 has an armature 46 and a multiplicity of spring elements 47 which generate a restoring force between the armature 46 and the first busbar 15. As an alternative to the helical springs shown, leaf springs, in particular wave leaf springs, can also be used as spring elements.

Figure 8:
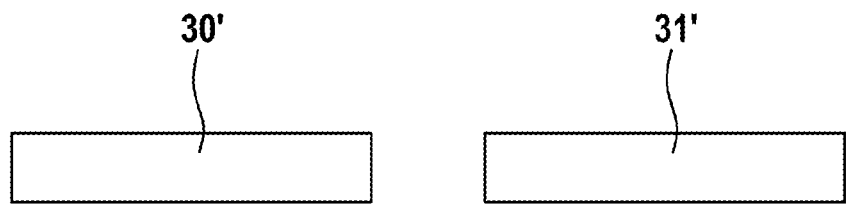
FIG. 8 shows a basic sketch of two connection elements according to the prior art.

FIG. 8 shows a basic sketch of two connection elements 30', 31' according to the prior art. The arrangement shown therefore differs from the exemplary embodiments in that the connection elements 30', 31' are not arranged in a connection space which is delimited in the vertical direction by busbars.

Figure 9:
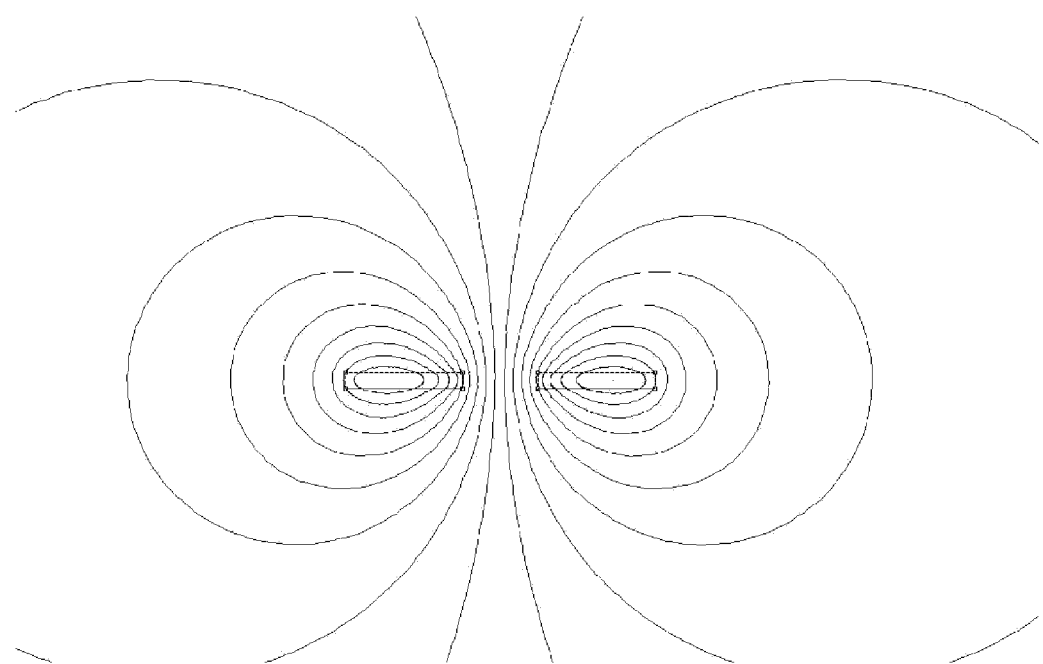
FIG. 9 shows a magnetic field distribution during operation of the connection elements shown in FIG. 8 with direct current.
Figure 10:
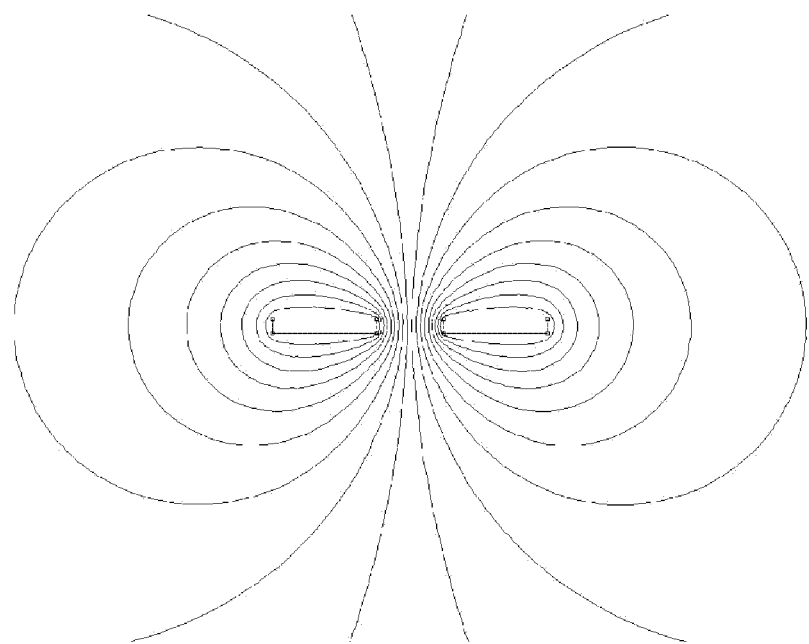
FIG. 10 shows a magnetic field distribution for a high-frequency alternating field during operation of the connection elements shown in FIG. 8.

FIG. 9 and FIG. 10 each show a magnetic field distribution during operation of the connection elements shown in FIG. 8, with FIG. 9 showing operation with a direct current and FIG. 10 showing a high-frequency alternating field in the megahertz range.

As can be seen, the magnetic flux density is distributed similarly to a two-wire line with opposite current directions, such that the magnetic flux density runs perpendicularly to a surface spanned by the connection elements 30', 31'. The magnitude of the magnetic flux density is also greatest in the area of the spanned surface. This results in high values of a magnetic flux, which causes high stray inductances 32, 33 (see FIG. 1).

Figure 11:
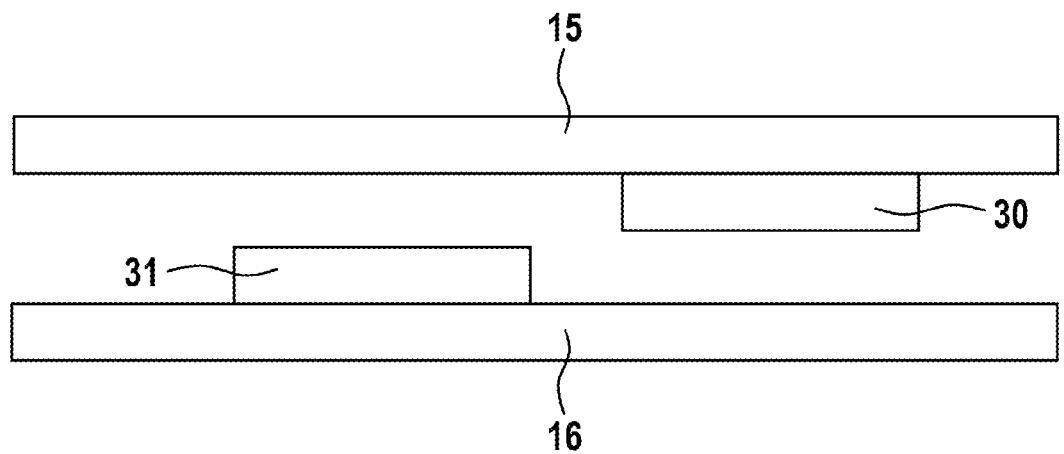
FIG. 11 shows a basic sketch of two connection elements with busbars according to the invention.

FIG. 11 is a basic sketch of two connection elements 30, 31 and the busbars 15, 16, which essentially corresponds to the arrangement according to the first exemplary embodiment of the electrical device 6. The representations of FIG. 12 and FIG. 13 correspond to the representations in FIG. 9 and FIG. 10, respectively.

Figure 12:
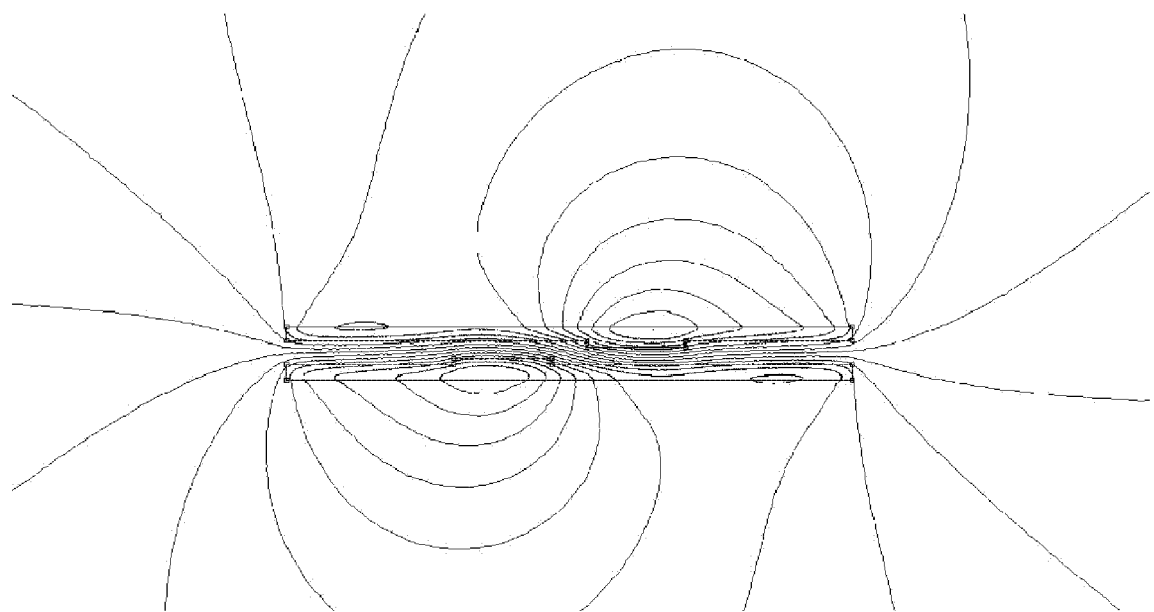
FIG. 12 shows a magnetic field distribution during operation of the device according to FIG. 11 with direct current.
Figure 13:
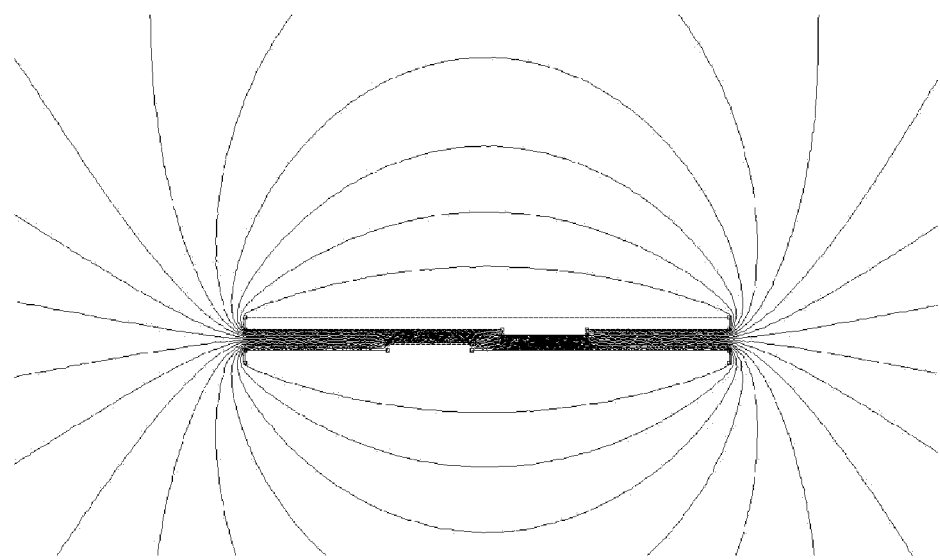
FIG. 13 shows a magnetic field distribution for a high-frequency alternating field during operation of the device according to FIG. 11.

By comparing FIG. 9 and FIG. 10 on the one hand and FIG. 12 and FIG. 13 on the other hand, it becomes clear that the magnetic field distribution is significantly modified in the case of the arrangement according to FIG. 11, since the field lines between the connection elements 30, 31 run substantially in the transverse direction and not in the vertical direction as in FIG. 9 and FIG. 10. That is to say the surface spanned by the connection elements 30, 31 is permeated only to a very small extent by components in the vertical direction of the magnetic flux density, such that only very low values of the magnetic flux arise. At the same time, an axis of a resulting magnetic dipole moment in the high-frequency alternating field according to FIG. 13 shifts from the vertical direction to the transverse direction. Due to induced eddy currents, the interior of the conductors of the connecting elements 30, 31 is practically field-free in the case of a high-frequency alternating field, and the mean path lengths of the magnetic field lines are significantly longer than in FIG. 10. All of this reduces the stray inductances 32, 33 (see FIG. 1) considerably, whereby it should be noted that the field distributions shown illustrate this effect qualitatively and relate only to a section. The shielding effect is even greater if it continues in the transverse direction.

Figure 14:
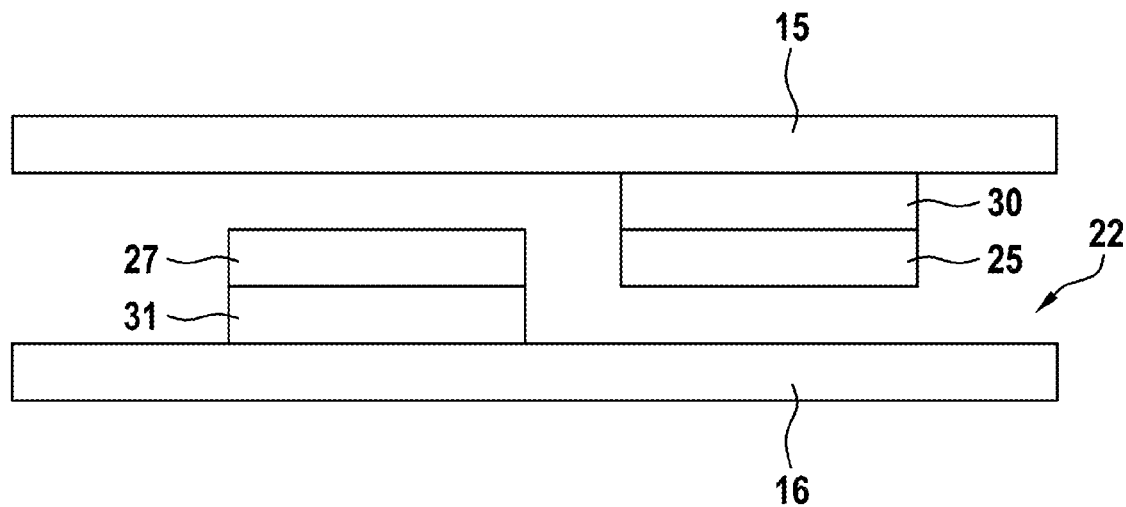
FIG. 14 shows a basic sketch of four connection elements with busbars according to a fourth exemplary embodiment of the device according to the invention.
Figure 15:
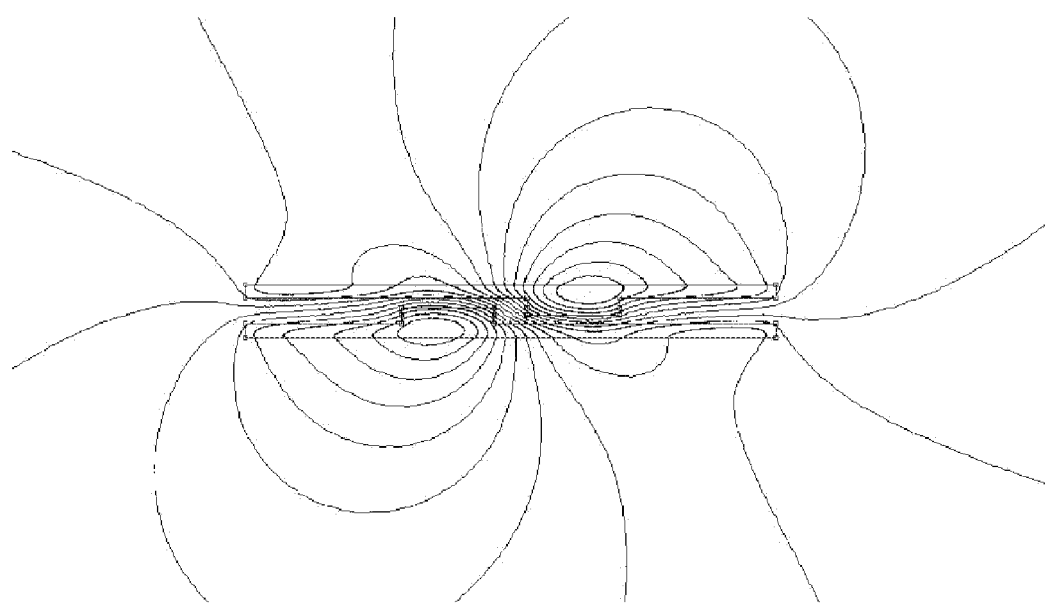
FIG. 15 shows a magnetic field distribution during operation of the device according to FIG. 14 with direct current.
Figure 16:
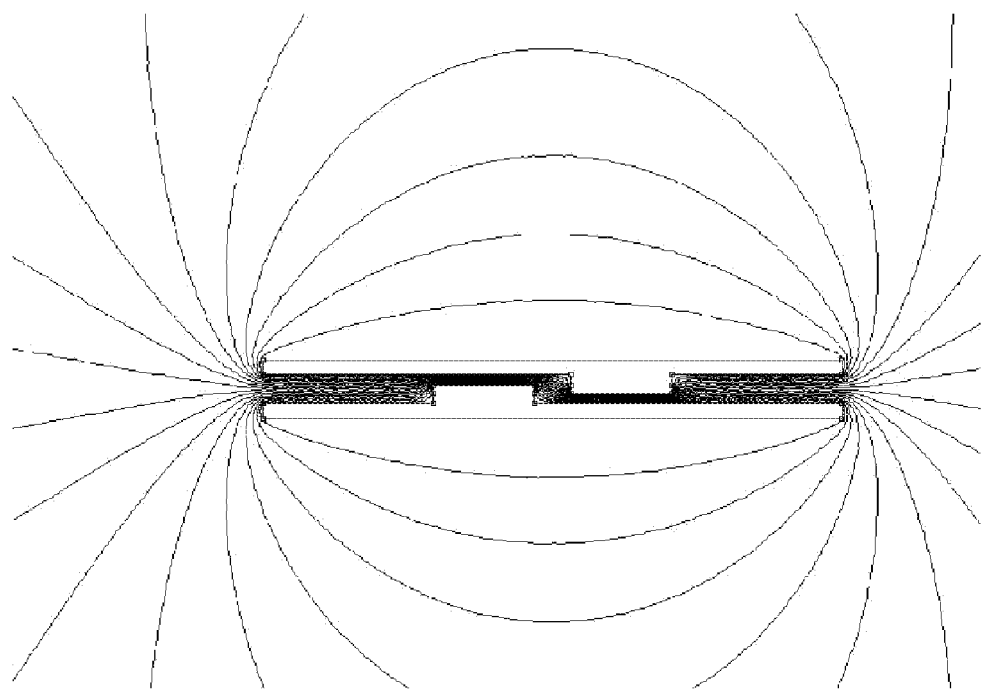
FIG. 16 shows a magnetic field distribution for a high-frequency alternating field during operation of the device according to FIG. 14.

FIG. 14 is a basic sketch of four connection elements 25, 27, 30, 31 with the busbars 15, 16 according to a fourth exemplary embodiment of the electrical device 6.

In this exemplary embodiment, the connection elements 25, 27 of the contact-connection devices 24, 26 are connected to the busbars 15, 16 via the connection elements 30, 31 of the connection arrangements 28, 29, that is to say they are not in contact with the busbars 15, 16. Analogously to FIG. 9 and FIG. 10, FIG. 15 and FIG. 16 show the resulting field distribution. In this exemplary embodiment, the stray inductances 34, 35 (see FIG. 1) can also be reduced. In the spanned area, the magnetic field lines have components in the transverse direction and in the vertical direction.

Figure 17:
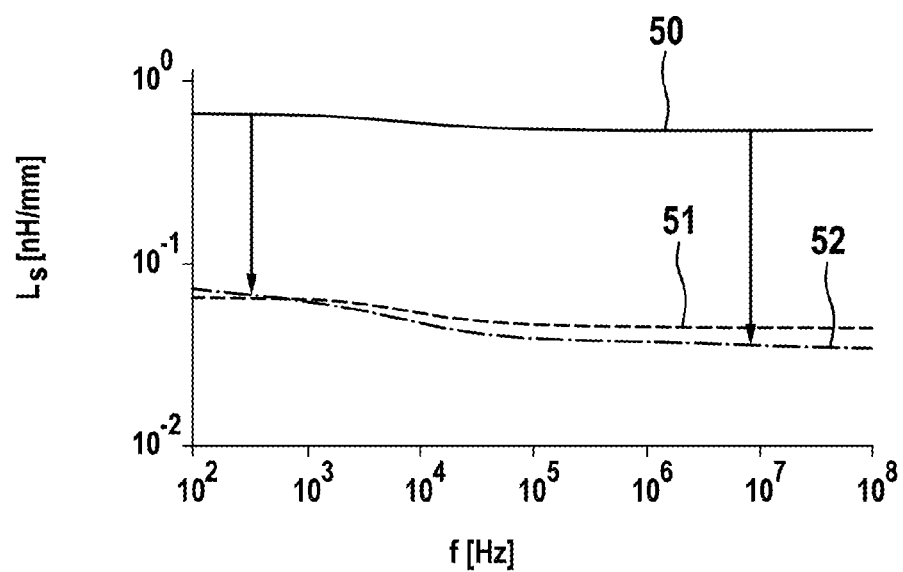
FIG. 17 shows a double logarithmic graph of an inductance per unit length versus frequency.
Figure 18:
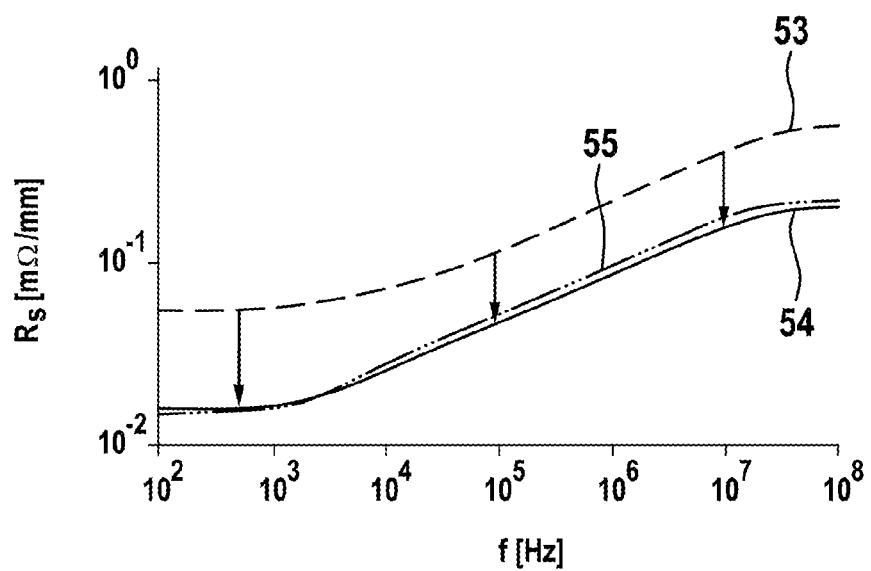
FIG. 18 shows a double logarithmic graph of a resistance per unit length versus frequency.

FIG. 17 is a double logarithmic graph of an inductance per unit length $L_S$ versus a frequency f. FIG. 18 is a double logarithmic graph of a resistance per unit length $R_S$ versus the frequency f. A profile 50 shows the inductance per unit length and a profile 53 shows the resistance per unit length of an arrangement of the connection elements 30', 31' according to FIG. 8 as reference. Profiles 51, 54 refer to the inductance per unit length or the resistance per unit length of the connection elements 30, 31 according to FIG. 11. Profiles 52, 55 refer to the inductance per unit length or the resistance per unit length of the connection elements 30, 31 according to FIG. 14.

As can be seen, the inductance per unit length can be reduced by a factor of at least 10 compared to the reference over a wide frequency range by the transverse rail system. The resistance per unit length can also be reduced by a factor of at least 6 compared to the reference over wide frequency ranges.

The invention claimed is:

1. An electrical device for a converter, comprising:
   a capacitor arrangement having at least one capacitor having a first connection and a second connection;
   a first busbar and a second busbar, wherein a respective busbar at least within a section has a greater extension along a transverse direction than along a longitudinal direction, within the section has a greater extension along the longitudinal direction than along a vertical direction and in the section has a first surface and a second surface which are opposite one another with respect to the vertical direction;
   a first contact-connection device which is electrically conductively contact-connected to the first connection of the at least one capacitor and via which the first connection of the at least one capacitor is electrically conductively connected to the first busbar; and
   a second contact-connection device which is electrically conductively contact-connected to the second connection of the at least one capacitor and via which the second connection of the at least one capacitor is electrically conductively connected to the second busbar;
   wherein the second surface of the first busbar is opposite to and spaced apart in the vertical direction from the first surface of the second busbar in the section, such that the busbars delimit a connection space in the vertical direction for connecting a semiconductor power unit,
   wherein the semiconductor power unit has at least one semiconductor switch arrangement, a first connection arrangement, and a second connection arrangement, and
   wherein the first connection arrangement is electrically conductively connected to the first busbar and the second connection arrangement is electrically conductively connected to the second busbar.

2. The electrical device as claimed in claim 1, wherein the first contact-connection device is contact-connected to the second surface or the first surface of the first busbar.

3. The electrical device as claimed in claim 1, wherein the second contact-connection device is contact-connected to the first surface or the second surface of the second busbar.

4. The electrical device as claimed in claim 1, wherein the first contact-connection device and/or the second contact-connection device in the region thereof that contact-connects the busbar has connection elements that are separated in the transverse direction.

5. The electrical device as claimed in claim 1, wherein the first connection arrangement is contact-connected to the first busbar and/or the second connection arrangement is contact-connected to the second busbar.

6. The electrical device as claimed in claim 1, wherein the first connection arrangement has a plurality of connection elements separated in the transverse direction and/or the second connection arrangement has a plurality of connection elements separated in the transverse direction.

7. The electrical device as claimed in claim 1, wherein the first connection arrangement and the second connection arrangement extend in a plane spanned by the longitudinal direction and the transverse direction, or the first connection arrangement and the second connection arrangement each extend in a plane spanned by the longitudinal direction and the transverse direction, wherein the planes are spaced apart in the vertical direction.

8. The electrical device as claimed in claim 1, further comprising:
   wherein the first contact-connection device is contact-connected to the second surface of the first busbar and the first connection arrangement is electrically conductively connected to the first busbar via the first contact-connection device or the first connection arrangement is contact-connected to the second surface of the first busbar and the first contact-connection device is electrically conductively connected to the first busbar via the first connection arrangement and/or
   the second contact-connection device is contact-connected to the first surface of the second busbar and the second connection arrangement is electrically conductively connected to the second busbar via the second contact-connection device or the second connection arrangement is contact-connected to the first surface of the second busbar and the second contact-connection device is electrically conductively connected to the second busbar via the second connection arrangement.

9. The electrical device as claimed in claim 1, wherein an isolating means which electrically isolates the busbars from one another is arranged in the connection space.

10. The electrical device as claimed in claim 1, further comprising a clamping device by way of which the busbars and the contact-connection devices are clamped together.

11. The electrical device as claimed in claim 1, further comprising a pressing device by way of which the busbars and the contact-connection devices are pressed together.

12. The electrical device as claimed in claim 1, further comprising a cooling device which is thermally conductively connected to a busbar or to the busbars.

13. The electrical device as claimed in claim 12, wherein the cooling device lies flat on the first surface of the first busbar and/or flat on the second surface of the second busbar.

14. A converter, comprising an electrical device as claimed in claim 1, wherein the capacitor arrangement is configured as a link circuit capacitor and the busbars form DC voltage connections.

15. An arrangement having an electric machine and a converter as claimed in claim 14, which converter is connected to the electric machine to provide a single-phase or multi-phase AC voltage.

\* \* \* \* \*